United States Patent
Kim et al.

(10) Patent No.: US 9,848,441 B2
(45) Date of Patent: Dec. 19, 2017

(54) METHOD AND APPARATUS FOR RECEIVING DOWNLINK CONTROL INFORMATION THROUGH AN ENHANCED PHYSICAL DOWNLINK CONTROL CHANNEL IN WIRELESS COMMUNICATION

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 194 days.

(21) Appl. No.: 14/767,487

(22) PCT Filed: Feb. 13, 2014

(86) PCT No.: PCT/KR2014/001181
§ 371 (c)(1),
(2) Date: Aug. 12, 2015

(87) PCT Pub. No.: WO2014/126396
PCT Pub. Date: Aug. 21, 2014

(65) Prior Publication Data
US 2015/0382379 A1    Dec. 31, 2015

Related U.S. Application Data

(60) Provisional application No. 61/764,522, filed on Feb. 13, 2013.

(51) Int. Cl.
*H04W 74/00* (2009.01)
*H04L 5/00* (2006.01)
(Continued)

(52) U.S. Cl.
CPC ......... *H04W 74/006* (2013.01); *H04L 5/0053* (2013.01); *H04L 5/0092* (2013.01);
(Continued)

(58) Field of Classification Search
CPC ... H04W 24/00; H04W 72/04; H04W 72/042; H04W 88/02; H04L 5/0053; H04L 5/0092
See application file for complete search history.

(56) References Cited

U.S. PATENT DOCUMENTS

2009/0298493 A1    12/2009    Lin
2011/0110316 A1     5/2011    Chen et al.
(Continued)

FOREIGN PATENT DOCUMENTS

EP    2 582 170 A1    4/2013
EP    2582170    *    4/2013
(Continued)

*Primary Examiner* — Ian N Moore
*Assistant Examiner* — Mewale Ambaye
(74) *Attorney, Agent, or Firm* — Birch, Stewart, Kolasch & Birch, LLP

(57) ABSTRACT

A method for receiving downlink control information by a terminal in a wireless communication system, according to one embodiment of the present invention, comprises the steps of: determining enhanced physical downlink control channel (EPDCCH) candidates per aggregation level in an enhanced physical downlink control channel physical resource block (EPDCCH PRB) set; and performing monitoring in a set of the EPDCCH candidates, wherein enhanced control channel elements (ECCE) constituting the respective EPDCCH candidates are distributed in the EPDCCH PRB set.

12 Claims, 14 Drawing Sheets

(51) Int. Cl.
    *H04W 72/04*    (2009.01)
    *H04W 88/02*    (2009.01)
    *H04W 24/00*    (2009.01)
    *H04W 72/00*    (2009.01)

(52) U.S. Cl.
    CPC ............ *H04W 24/00* (2013.01); *H04W 72/00* (2013.01); *H04W 72/04* (2013.01); *H04W 72/042* (2013.01); *H04W 88/02* (2013.01)

(56) References Cited

U.S. PATENT DOCUMENTS

| | | | |
|---|---|---|---|
| 2012/0044922 A1* | 2/2012 | Ishii | H04L 5/001 370/338 |
| 2013/0194931 A1* | 8/2013 | Lee | H04L 5/0053 370/241 |
| 2013/0250906 A1 | 9/2013 | Golitschek Edler von Elbwart | |

FOREIGN PATENT DOCUMENTS

| | | |
|---|---|---|
| KR | 10-1085035 B1 | 11/2011 |
| KR | 10-2012-0004543 A | 1/2012 |
| WO | WO 2011/157038 A1 | 12/2011 |
| WO | WO 2012/041467 A1 | 4/2012 |
| WO | WO 2013/002528 A2 | 1/2013 |

\* cited by examiner

FIG. 6
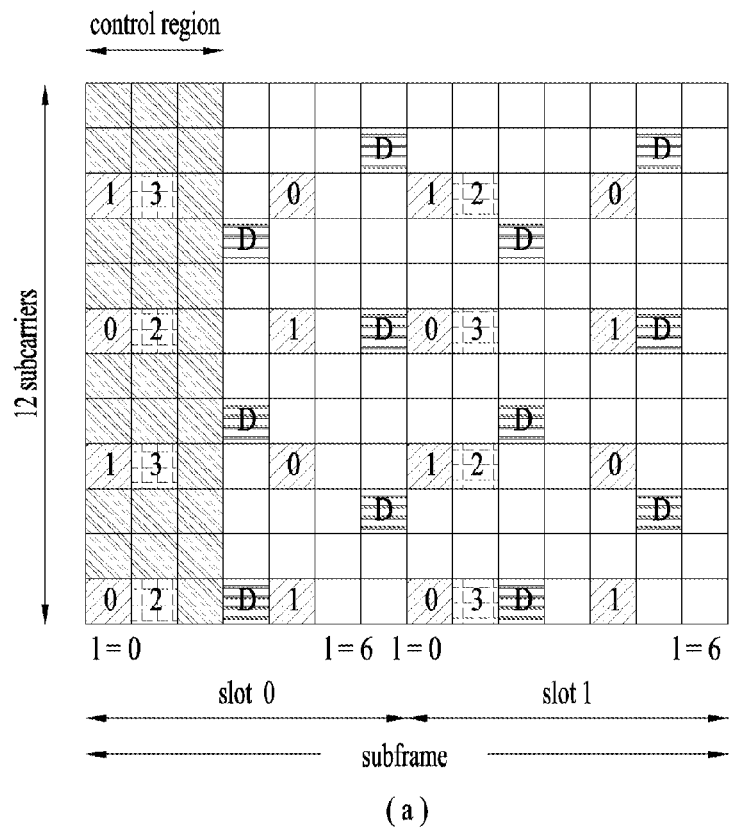
(a)
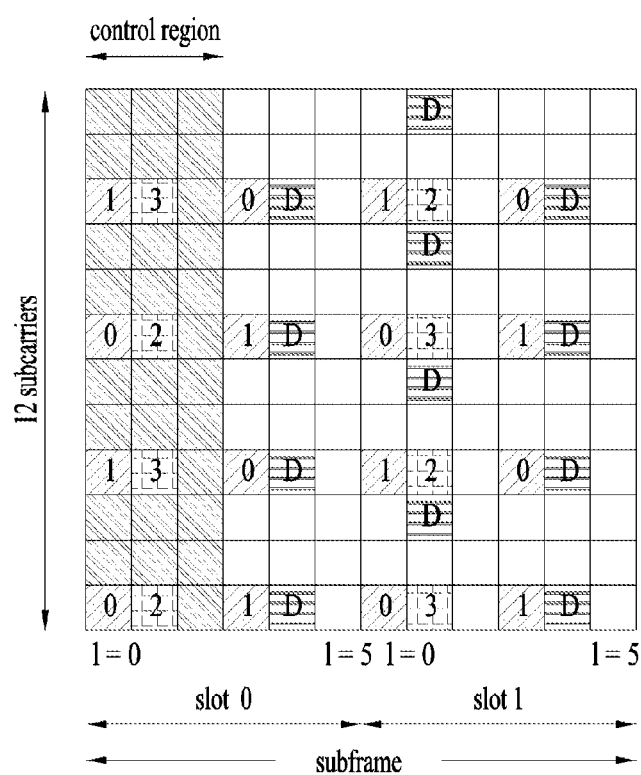

FIG. 7

FIG. 8
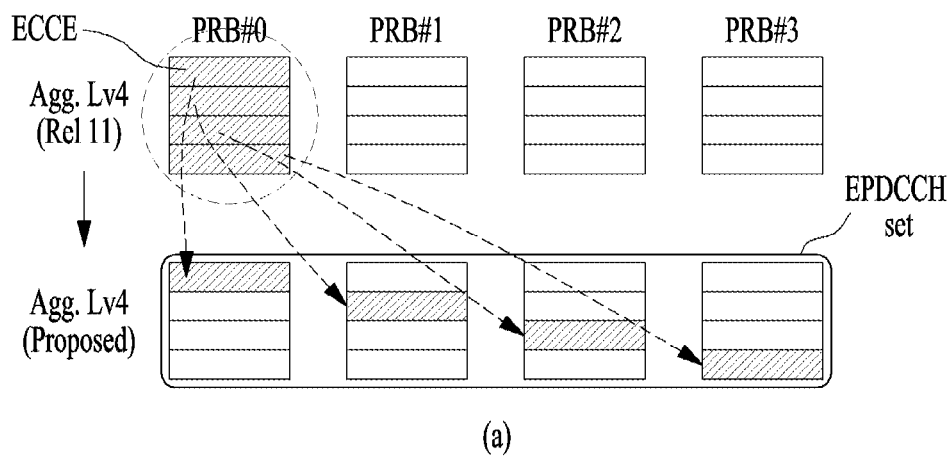
(a)
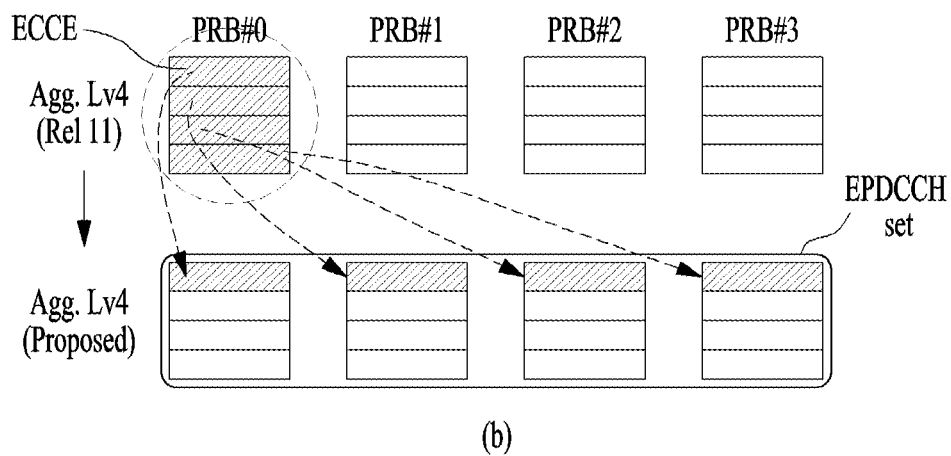
(b)

FIG. 9
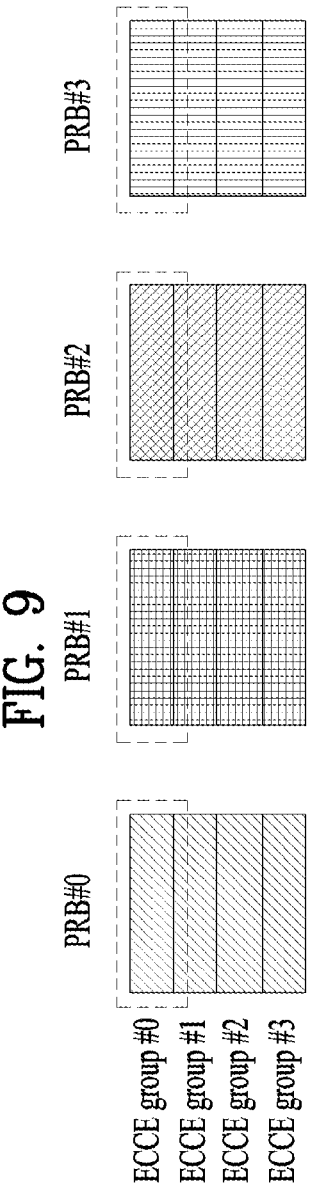
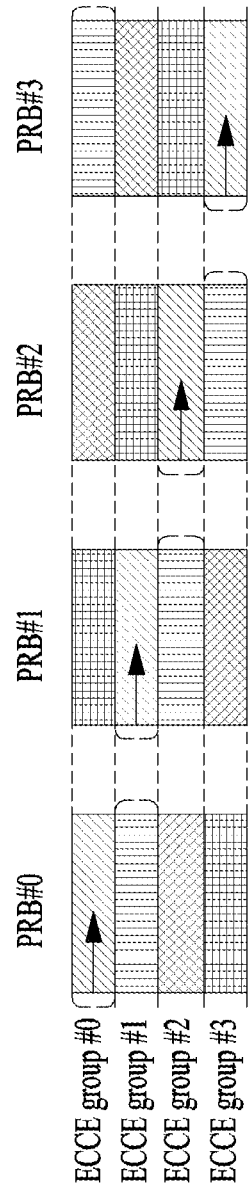
Fix the location of representative (e.g. lowest indexed)ECCEs

METHOD AND APPARATUS FOR RECEIVING DOWNLINK CONTROL INFORMATION THROUGH AN ENHANCED PHYSICAL DOWNLINK CONTROL CHANNEL IN WIRELESS COMMUNICATION

Cross Reference to Related Applications

This application is the National Phase of PCT International Application No. PCT/KR2014/001181, filed on Feb. 13, 2014, which claims priority under 35 U.S.C. 119(e) to U.S. Provisional Application No. 61/764,522, filed on Feb. 13, 2013, all of which are hereby expressly incorporated by reference into the present application.

TECHNICAL FIELD

The present invention relates to a wireless communication system, and more particularly, to a method and apparatus for receiving downlink control information through an enhanced physical control channel (EPDDCH).

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

One object of the present invention is to provide a structure of an EPDCCH that may be used when control information is transmitted through a localized EPDCCH, and a structure of a search space.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first technical aspect of the present invention, a method for enabling a user equipment to receive downlink control information in a wireless communication system comprises the steps of determining enhanced physical downlink control channel (EPDCCH) candidates per aggregation level in an enhanced physical downlink control channel physical resource block (EPDCCH PRB) set; and performing monitoring in a set of the EPDCCH candidates, wherein enhanced control channel elements (ECCE) constituting the respective EPDCCH candidates are distributed in the EPDCCH PRB set.

In a second technical aspect of the present invention, a user equipment in a wireless communication system comprises a reception module; and a processor, wherein the processor determines enhanced physical downlink control channel (EPDCCH) candidates per aggregation level in an enhanced physical downlink control channel physical resource block (EPDCCH PRB) set and performs monitoring in a set of the EPDCCH candidates, and enhanced control channel elements (ECCE) constituting the respective EPDCCH candidates are distributed in the EPDCCH PRB set.

The first and second technical aspects of the present invention may include all/some of the followings.

The (y+1)th ($1 \leq y <$ aggregation level) ECCE of each of the EPDCCH candidates may be shifted from the yth ECCE as much as at least a predetermined number of ECCEs.

The first ECCE of the (x+1)th ($1 \leq x <$ the number of EPDCCH candidates) EPDCCH candidate and the first ECCE of the xth EPDCCH candidate may be distributed to be adjacent to each other as much as a value of the aggregation level or less.

The predetermined number may be increased if the number of PRB pairs included in the EPDCCH PRB set is increased in the aggregation level 2.

The predetermined number may be given equally regardless of a size of the EPDCCH PRB set if the aggregation level is greater than 8.

The predetermined number may correspond to 5, 5 and 9 if the aggregation level is 4 and the number of RPB pairs included in the EPDCCH PRB set corresponds to 2, 4 and 8.

The first ECCE of the EPDCCH PRB set may be regarded as next ECCE of the last ECCE of the EPDCCH PRB set when the shift is performed.

The predetermined number may correspond to $$\left\{ 1 + \max\left(1, \frac{N_{RB}^{S_m}}{L}\right) \cdot N_{RB}^{ECCE} \right\},$$

wherein $N_{RB}^{S_m}$ is the number of RBs which belong to the EPDCCH PRB set ($S_m$), and $N_{RB}^{ECCE}$ is the number of ECCEs included in one PRB pair.

The EPDCCH candidates may be determined by the following Equation:

$$\left[ L\{(Y_{p,k} + m + n_{CI}) \bmod \lfloor N_{ECCE,p,k}/L \rfloor\} + i \cdot \left\{ 1 + \max\left(1, \frac{N_{RB}^{S_m}}{L}\right) \cdot N_{RB}^{ECCE} \right\} \right]$$
$$\bmod N_{ECCE,p,k},$$

where L is the aggregation level, $Y_{p,k}$ is initial offset of the kth subframe in the pth EPDCCH PRB set, $M_p^{(L)}$ is the number of EPDCCH candidates for the aggregation level L in the pth EPDCCH PRB set, m(=0, 1, ... $M_p^{(L)}$−1) is the order of EPDCCH candidates, $N_{ECCE,p,k}$ is the number of ECCEs constituting the kth subframe in the pth EPDCCH PRB set, $n_{CI}$ is carrier index, i(=0, 1, ... L−1) is the order of ECCEs constituting a specific EPDCCH, $N_{RB}^{S_m}$ is the number of RBs which belong to the EPDCCH PRB set ($S_m$), and $N_{RB}^{ECCE}$ is the number of ECCEs included in one PRB pair.

The EPDCCH candidates are determined by the following Equation:

$$\left[(Y_{p,k} + m + n_{CI}) + i \cdot \left\{1 + \max\left(1, \frac{N_{RB}^{S_m}}{L}\right) \cdot N_{RB}^{ECCE}\right\}\right] \mod N_{ECCE,p,k},$$

where L is the aggregation level, $Y_{p,k}$ is initial offset of the kth subframe in the pth EPDCCH PRB set, $M_p^{(L)}$ is the number of EPDCCH candidates for the aggregation level L in the pth EPDCCH PRB set, $m(=0, 1, \ldots M_p^{(L)}-1)$ is the order of EPDCCH candidates, $N_{ECCE,p,k}$ is the number of ECCEs constituting the kth subframe in the pth EPDCCH PRB set, $n_{CI}$ is carrier index, $i(=0, 1, \ldots L-1)$ is the order of ECCEs constituting a specific EPDCCH, $N_{RB}^{S_m}$ is the number of RBs which belong to the EPDCCH PRB set ($S_m$), and $N_{RB}^{ECCE}$ is the number of ECCEs included in one PRB pair.

The EPDCCH candidates may be determined by the following Equation:

$$\left[L\left\{\left(Y_{p,k} + \left\lfloor\frac{m \cdot N_{ECCE,p,k}}{L \cdot M_p^{(L)}}\right\rfloor\right) + n_{CI}\right\} \mod \lfloor N_{ECCE,p,k}/L\rfloor\right\} + i \cdot \left\{1 + \max\left(1, \frac{N_{RB}^{S_m}}{L}\right) \cdot N_{RB}^{ECCE}\right\}\right] \mod N_{ECCE,p,k},$$

where L is the aggregation level, $Y_{p,k}$ is initial offset of the kth subframe in the pth EPDCCH PRB set, $M_p^{(L)}$ is the number of EPDCCH candidates for the aggregation level L in the pth EPDCCH PRB set, $m(=0, 1, \ldots M_p^{(L)}-1)$ is the order of EPDCCH candidates, $N_{ECCE,p,k}$ is the number of ECCEs constituting the kth subframe in the pth EPDCCH PRB set, $n_{CI}$ is carrier index, $i(=0, 1, \ldots L-1)$ is the order of ECCEs constituting a specific EPDCCH, $N_{RB}^{S_m}$ is the number of RBs which belong to the EPDCCH PRB set ($S_m$), and $N_{RB}^{ECCE}$ is the number of ECCEs included in one PRB pair.

The user equipment may measure wideband channel state information for an area corresponding to the EPDCCH PRB set.

Advantageous Effects

According to the present invention, EPDCCH may be received while interference from a neighboring cell is being minimized.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a reference signal;
FIG. 7 is a diagram illustrating EREG (Enhanced Resource Element Group) to ECCE (Enhanced Control Channel Element) mapping;
FIGS. 8 and 9 are diagrams illustrating structures of EPDCCH according to the embodiment of the present invention.

BEST MODE FOR CARRYING OUT THE INVENTION

Figure 1:
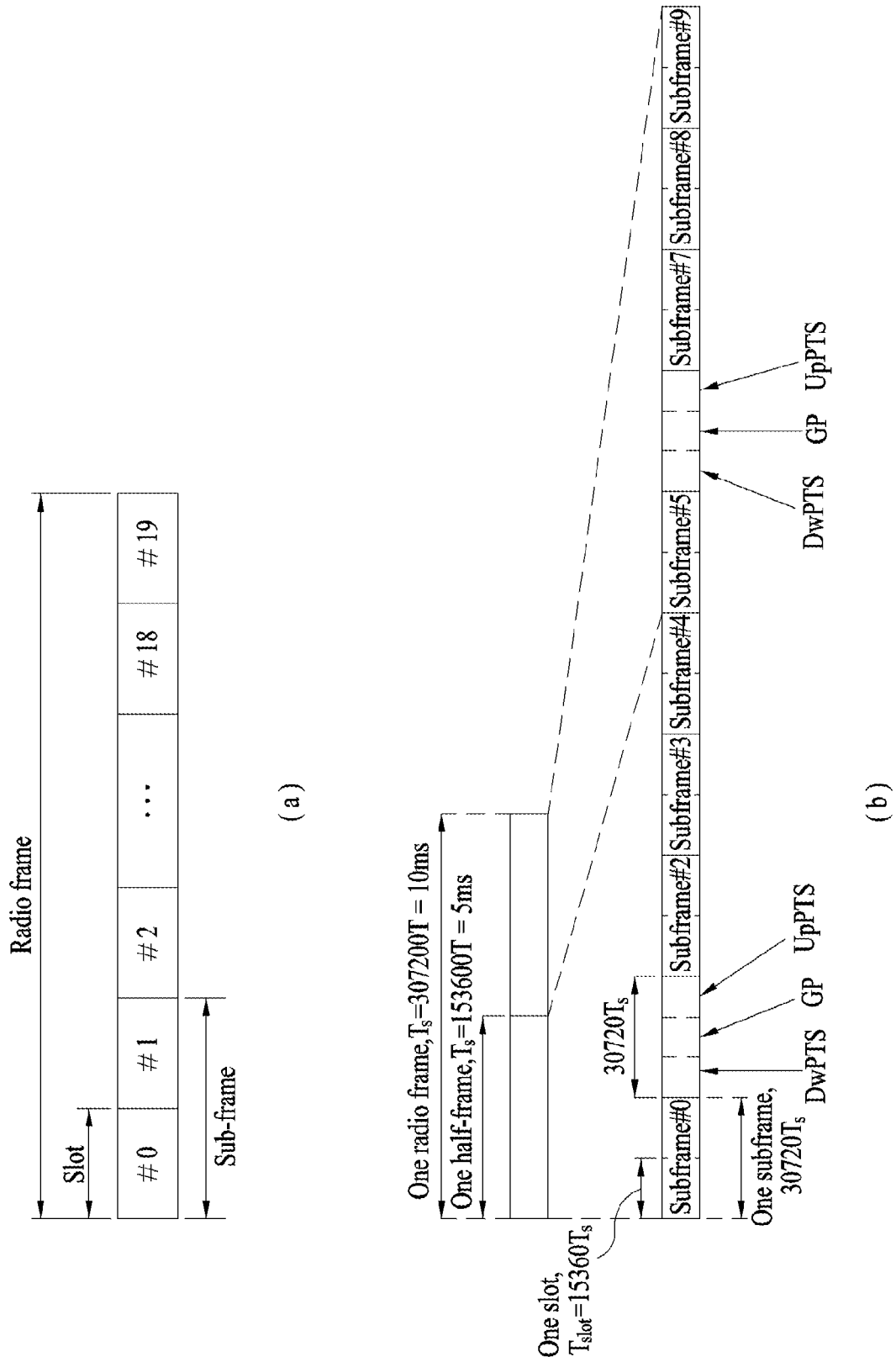
FIG. 1 is a diagram illustrating a structure of a radio frame.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
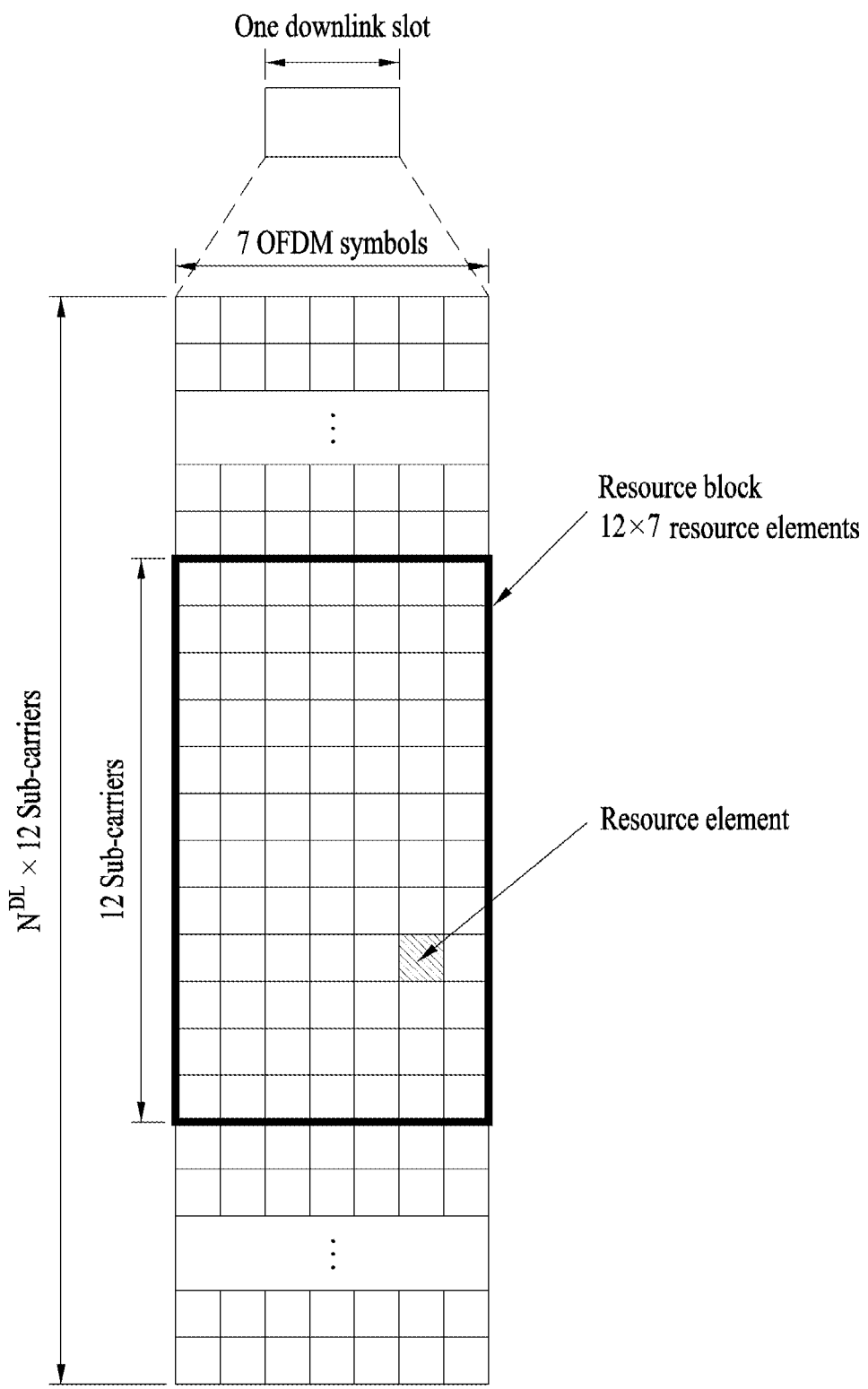
FIG. 2 is a diagram illustrating a resource grid at a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
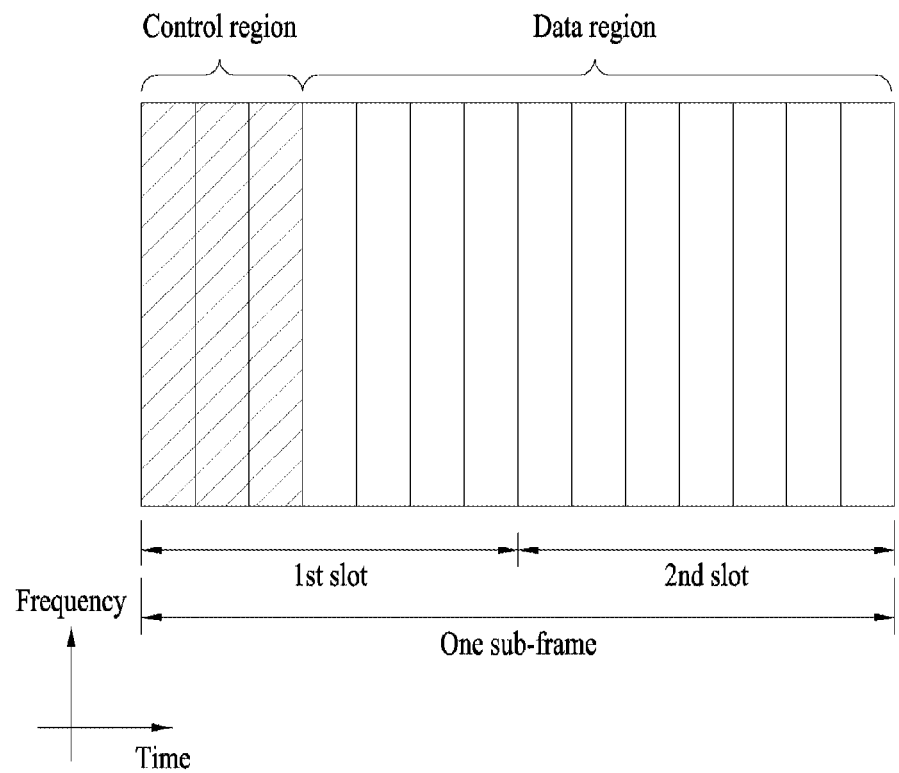
FIG. 3 is a diagram illustrating a structure of a downlink subframe.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmit power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmit power control commands for individual UEs of a UE group, transmit power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
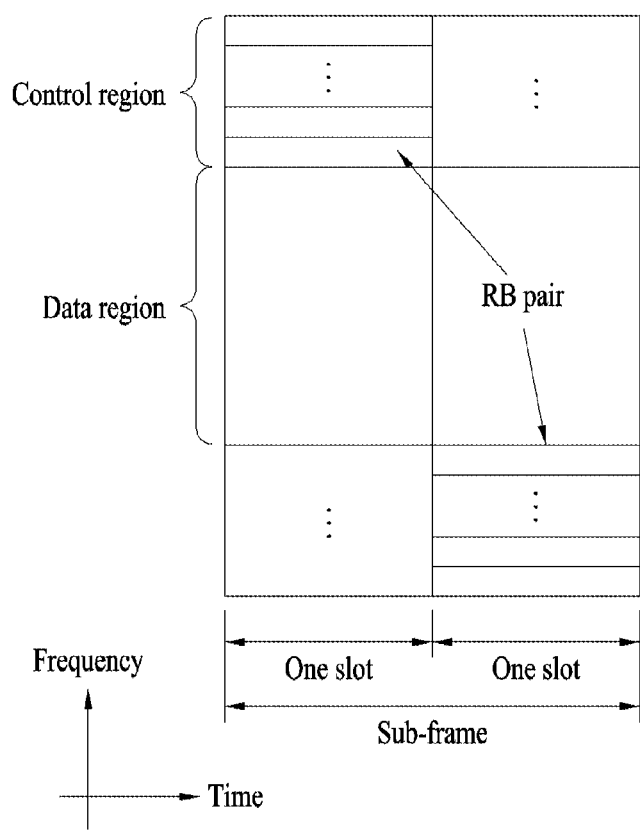
FIG. 4 is a diagram illustrating a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

DCI Format

DCI formats 0, 1, 1A, 1B, 1C, 1D, 2, 2A, 2B, 2C, 3, 3A and 4 are defined in LTE-A (Release 10). DCI formats 0, 1A, 3 and 3A are defined to have the same message size to reduce the number of times of blind decoding, which will be described later. The DCI formats may be divided into i) DCI formats 0 and 4 used for uplink grant, ii) DCI formats 1, 1A, 1B, 1C, 1D, 2, 2A, 2B and 2C used for downlink scheduling allocation, and iii) DCI formats 3 and 3A for power control commands according to purposes of use of control information to be transmitted.

DCI format 0 used for uplink grant may include a carrier indicator necessary for carrier aggregation, which will be described later, an offset (flag for format 0/format 1A differentiation) used to differentiate DCI formats 0 and 1A from each other, a frequency hopping flag that indicates whether frequency hopping is used for uplink PUSCH transmission, information about resource block assignment, used for a UE to transmit a PUSCH, a modulation and coding scheme, a new data indicator used to empty a buffer for initial transmission in relation to a HARQ process, a transmit power control (TPC) command for a scheduled PUSCH, information about a cyclic shift for a demodulation reference signal (DMRS) and OCC index, and a UL index and channel quality indicator request (CSI request) necessary for a TDD operation, etc. DCI format 0 does not include a redundancy version, unlike DCI formats relating to downlink scheduling allocation since DCI format 0 uses synchronous HARQ. The carrier indicator is not included in DCI formats when cross-carrier scheduling is not used.

DCI format 4, which is newly added to DCI formats in LTE-A Release 10, supports application of spatial multiplexing to uplink transmission in LTE-A. DCI format 4 has a larger message size DCI format 0 because it further includes information for spatial multiplexing. DCI format 4 includes additional control information in addition to control information included in DCI format 0. That is, DCI format 4 includes information on a modulation and coding scheme for the second transmission block, precoding information for multi-antenna transmission, and sounding reference signal (SRS) request information. DCI format 4 does not include an offset for differentiation between formats 0 and 1A because it has a larger size than DCI format 0.

DCI formats 1, 1A, 1B, 1C, 1D, 2, 2A, 2B and 2C for downlink scheduling allocation may be broadly divided into DCI formats 1, 1A, 1B, 1C and 1D, which do not support spatial multiplexing, and DCI formats 2, 2A, 2B and 2C, which support spatial multiplexing.

DCI format 1C supports only frequency contiguous allocation as compact frequency allocation and does not include the carrier indicator and redundancy version, compared to the other formats.

DCI format 1A is for downlink scheduling and random access. DCI format 1A may include a carrier indicator, an indicator that indicates whether downlink distributed transmission is used, PDSCH resource allocation information, a modulation and coding scheme, a redundancy version, a HARQ processor number for indicating a processor used for soft combining, a new data indicator used to empty a buffer for initial transmission in relation to a HARQ process, a TPC command for a PUCCH, an uplink index necessary for a TDD operation, etc.

DCI format 1 includes control information similar to that of DCI format 1A. DCI format 1 supports non-contiguous resource allocation, while DCI format 1A is related to contiguous resource allocation. Accordingly, DCI format 1 further includes a resource allocation header, and thus slightly increases control signaling overhead as a trade-off for an increase in flexibility of resource allocation.

Both DCI formats 1B and 1D further include precoding information, compared to DCI format 1. DCI format 1B includes PMI acknowledgement and DCI format 1D includes downlink power offset information. Most control information included in DCI formats 1B and 1D corresponds to that of DCI format 1A.

DCI formats 2, 2A, 2B and 2C basically include most control information included in DCI format 1A and further include information for spatial multiplexing. The information for spatial multiplexing includes a modulation and coding scheme for the second transmission block, a new data indicator, and a redundancy version.

DCI format 2 supports closed loop spatial multiplexing, and DCI format 2A supports open loop spatial multiplexing. Both DCI formats 2 and 2A include precoding information. DCI format 2B supports dual layer spatial multiplexing combined with beamforming and further includes cyclic shift information for a DMRS. DCI format 2C, which may be regarded as an extended version of DCI format 2B, supports spatial multiplexing for up to 8 layers.

DCI formats 3 and 3A may be used to complement the TPC information included in the aforementioned DCI formats for uplink grant and downlink scheduling allocation, namely, to support semi-persistent scheduling. A 1-bit command is used per UE in the case of DCI format 3, while a 2-bit command is used per UE in the case of DCI format 3A.

One of the DCI formats described above is transmitted through a PDCCH, and a plurality of PDCCHs may be transmitted in a control region. A UE may monitor the plurality of PDCCHs.

PDCCH Processing

Control channel elements (CCEs), contiguous logical allocation units, are used to map a PDCCH to REs for efficient processing. A CCE includes a plurality of resource element groups (e.g., 9 REGs). Each REG includes four neighboring REs other than an RS.

The number of CCEs necessary for a specific PDCCH depends on a DCI payload corresponding to a control information size, a cell bandwidth, a channel coding rate, etc. Specifically, the number of CCEs for a specific PDCCH may be defined according to PDCCH formats as shown in Table 1.

TABLE 1

| PDCCH format | Number of CCEs | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

As described above, one of the four formats may be used for a PDCCH and is not known to the UE. Accordingly, the UE performs decoding without knowing the PDCCH format. This is called blind decoding. Since operation overhead is generated if a UE decodes all the CCEs usable for downlink for each PDCCH, a search space is defined in consideration of restriction on a scheduler and the number of decoding attempts.

That is, the search space is a set of candidate PDCCHs composed of CCEs on which a UE needs to attempt to perform decoding at an aggregation level. Each aggregation level and the corresponding number of candidate PDCCHs may be defined as shown in Table 2.

TABLE 2

| | Search space | | Number of PDCCH candidates |
| --- | --- | --- | --- |
| | Aggregation level | Size (CCE unit) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

As shown Table 2, the UE has a plurality of search spaces at each aggregation level because 4 aggregation levels are present. The search spaces may be divided into a UE-specific search space and a common search space, as shown in Table 2. The UE-specific search space is for specific UEs. Each UE may check an RNTI and CRC which mask a PDCCH by monitoring a UE-specific search space thereof (attempting to decode a PDCCH candidate set according to an available DCI format) and acquire control information when the RNTI and CRC are valid.

The common search space (CSS) is used for a case in which a plurality of UEs or all UEs need to receive PDCCHs, for system information dynamic scheduling or paging messages, for example. The CSS may be used for a specific UE for resource management. Furthermore, the CSS may overlap the UE-specific search space. The control information for the UEs may be masked by one of RA-RNTI, SI-RNTI and P-RNTI.

Specifically, the search space may be determined by Equation 1 given below.

$$L\{(Y_k+m')\bmod[N_{CCE,k}/L]\}+i \qquad \text{Equation 1}$$

Here, L denotes an aggregation level, $Y_k$ is a variable determined by an RNTI and subframe number k, and m' is the number of PDCCH candidates. If carrier aggregation is applied, $m'=m+M^{(L)}\cdot n_{CI}$ and otherwise, $m'=m$. Herein, $M^{(L)}$ is the number of PDCCH candidates. $N_{CCE,k}$ is the total number of CCEs in the control region of a k-th subframe, and i is a factor indicating an individual CCE in each PDCCH candidate and is set as i=0, 1, . . . , L−1. For the CSS, $Y_k$ is always determined to be 0.

Figure 5:
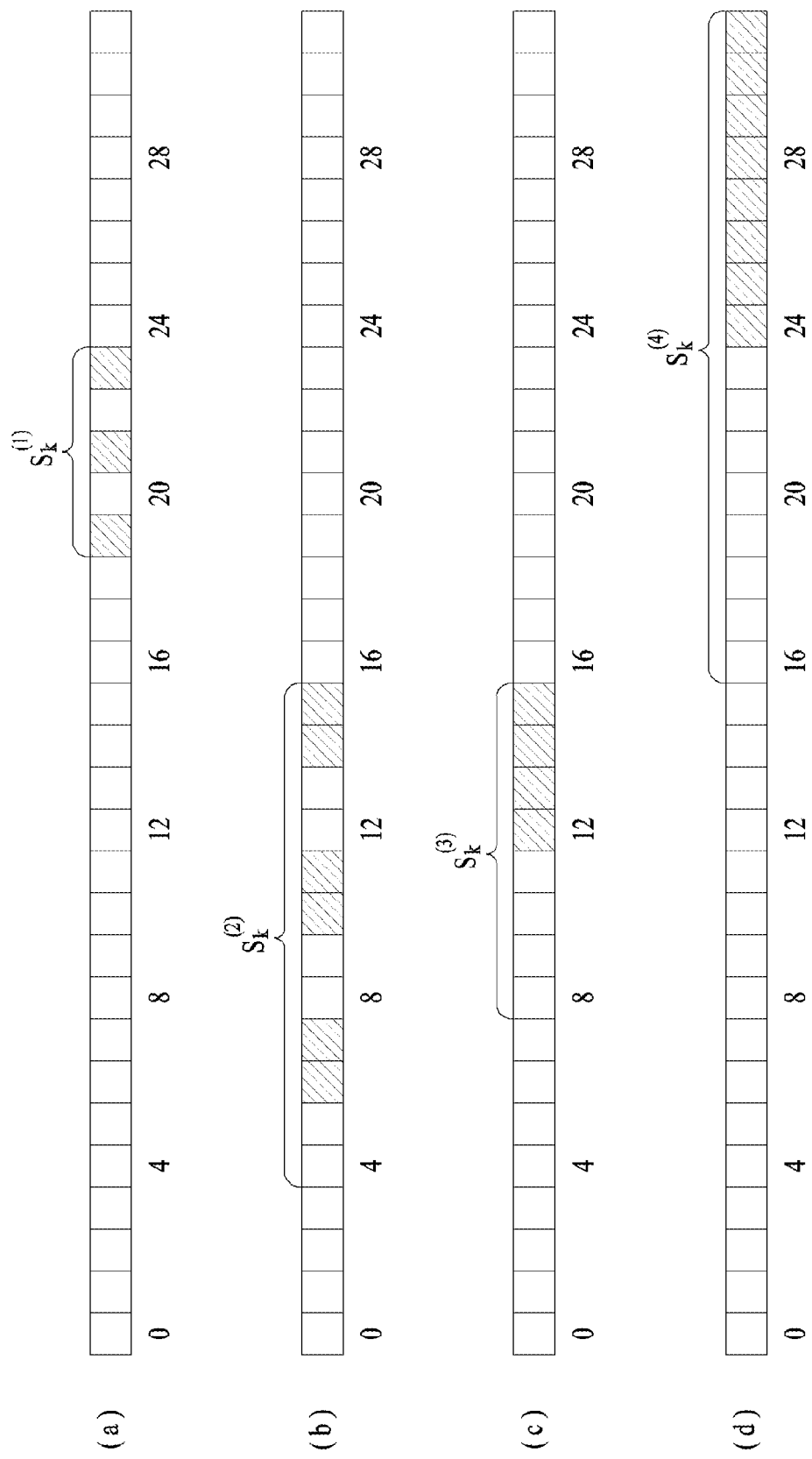
FIG. 5 is a diagram illustrating a search space.

FIG. 5 shows USSs (shaded portions) at respective aggregation levels which may be defined according to Equation 1. Carrier aggregation is not used, and $N_{CCE,k}$ is set to 32 for simplicity of illustration.

FIGS. 5(a), 5(b), 5(c) and 5(d) illustrate the cases of aggregation levels 1, 2, 4 and 8, respectively. The numbers represent CCE numbers. In FIG. 5, the start CCE of a search space at each aggregation level is determined based on an RNTI and subframe number k. This CCE may be differently determined among the aggregations levels in the same subframe for a UE due to the modulo function and L. The CCE is always determined to correspond to a multiple of the aggregation level due to L. In the description given below, $Y_k$ is assumed to be CCE 18. The UE attempts to sequentially perform decoding from the start CCE in units of CCEs determined for a corresponding aggregation level. In FIG. 5(b), for example, The UE attempts to perform decoding from CCE 4, the start CCE, for every two CCEs according to the aggregation levels.

In this manner, the UE attempts to perform decoding for a search space. The number of decoding attempts is determined by a DCI format and a transmission mode determined through radio resource control (RRC) signaling. If carrier aggregation is not applied, the UE needs to attempt to perform decoding up to 12 times in a CSS, in consideration of two DCI sizes (DCI formats 0/1A/3/3A and DCI format 1C) for each of six PDCCH candidates. In a USS, the UE needs to attempt to perform decoding up to 32 times, in consideration of two DCI sizes for each of 16 PDCCH candidates (6+6+2+2=16). Accordingly, when carrier aggregation is not applied, the UE needs to attempt to perform decoding up to 44 times.

On the other hand, if carrier aggregation is applied, the maximum number of decodings increases because as many decodings for a USS and DCI format 4 as the number of DL resources (DL component carriers) are added.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into a UL RS and a DL RS. In the current LTE system, the UL RSs include:

i) a demodulation-reference signal (DM-RS) for channel estimation for coherent demodulation of information transmitted over a PUSCH and a PUCCH, and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MB-SFN) reference signal transmitted for coherent demodulation of a signal transmitted in an MBSFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 6 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 6(a)) and a length of 12 OFDM symbols for an extended CP (FIG. 6(b)).

FIG. 6 shows locations of RSs on RB pairs in a system in which the BS supports four transmit antennas. In FIG. 6, resource elements (REs) denoted by "0", "1", "2" and "3" represent the locations of the CRSs for antenna port indexes 0, 1, 2 and 3, respectively. In FIG. 6, REs denoted by "D" represent locations of the DMRSs.

Enhanced EPDCCH (EPDCCH)

In the LTE system following Release 11, an enhanced-PDCCH (EPDCCH) has been considered as a solution for capacity lack of a PDCCH due to coordinated multi point (CoMP) or multi user-multiple input multiple output (MU-MIMO) or PDCCH performance reduction due to inter-cell interference. In the EPDCCH, in order to obtain precoding gain, etc., channel estimation may be performed based on a DMRS, unlike a legacy CRS-based PDCCH.

EPDCCH transmission may be divided into localized EPDCCH transmission and distributed EPDCCH transmission depending on the configuration of physical resource block (PRB) pairs used for EPDCCH transmission. The localized EPDCCH transmission means that ECCEs used for one DCI transmission are adjacent in the frequency domain and specific precoding is applicable in order to obtain beamforming gain. For example, localized EPDCCH transmission may be based on consecutive ECCEs corresponding to an aggregation level. In contrast, the distributed EPDCCH transmission means that one EPDCCH is transmitted from separated PRB pairs in the frequency domain, and has frequency diversity gain. For example, the distributed EPDCCH transmission may be based on an ECCE comprised of four EREGs which are respectively included in the separated PRB pairs in the frequency domain. One or two EPDCCH PRB sets may be configured for the user equipment through higher signaling, and each EPDCCH PRB set may be intended for any one of the localized EPDCCH transmission and the distributed EPDCCH transmission. If two EPDCCH PRB sets exist, all or some of the two sets may be overlapped.

The base station may transmit control information by mapping the control information into REs of EREG allocated for the EPDCCH from one or more EPDCCH PRB sets. In this case, the EREGs are used to define mapping of a control channel in RE, and 16 EREGs (EREG numbers 0 to 15) may exist for one PRB pair. Four EREGs (or eight EREGs as the case may be) may constitute one ECCE, x number of ECCEs (x is any one of 1, 2, 4, 8, 16 and 32) may constitute one EPDCCH. In case of the distributed EPDCCH transmission, EREGs existing in several PRB pairs may constitute one ECCE for diversity. In more detail, in case of the distributed EPDCCH transmission, EREG to ECCE mapping (hereinafter, first ECCE number-EREG number-PRB number relation) may mean that ECCE index in the EPDCCH PRB set corresponds to EREG index $$\left\lfloor \frac{n_{ECCE}}{N_P} \right\rfloor + i * N_{CP}$$

in the PRB pair index $$\left( n_{ECCE} + i * \max\left(1, \left\lfloor \frac{N_P}{N} \right\rfloor\right) \right) \bmod N_P.$$

Figure 7:
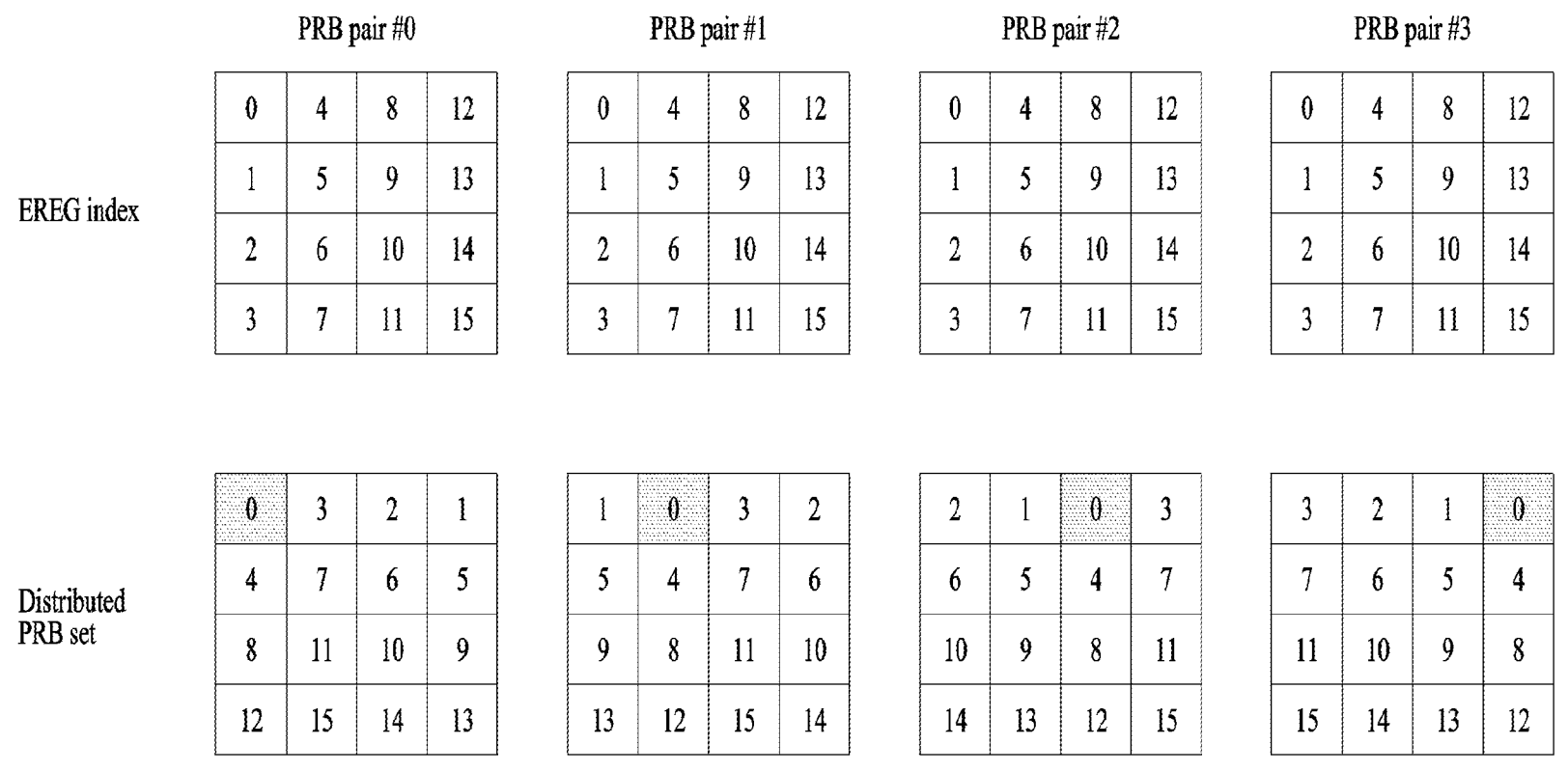

In this case, N means the number of EREGs per ECCE, $N_{CP}$ means the number of ECCEs per PRB pair, $N_{P,set1}$ means the number of PRB pairs of the first EPDCCH PRB set, $N_{P,set2}$ means the number of PRB pairs of the second EPDCCH PRB pair, and i=0, 1 . . . , N−1. For example, if four PRB pairs are included in the EPDCCH PRB set, according to the aforementioned first ECCE number-EREG number-PRB number relation, ECCE index 0 is comprised of EREG 0 of PRB pair 0, EREG 4 of PRB pair 1, EREG 8 of PRB pair 2, and EREG 12 of PRB pair 4. This EREG to ECCE mapping relation is shown in FIG. 7.

The user equipment may perform blind decoding similarly to the legacy LTE/LTE-A system to receive/acquire control information (DCI) through the EPDCCH. In more detail, the user equipment may attempt (monitor) decoding with respect to a set of EPDCCH candidates per aggregation level, for DCI formats corresponding to a set transmission mode. The set of EPDCCH candidates to be monitored may be referred to as an EPDCCH UE-specific search space and this search space may be set/configured per aggregation level. In addition, the aggregation level may be {1, 2, 4, 8, 16, 32} depending on subframe type, CP length and the amount of available resources in a PRB pair, slightly differently from the legacy LTE/LTE-A system.

In case of the UE configured with an EPDCCH, REs included in PRB pairs are indexed with EREGs, and these EREGs may be indexed with ECCE units. EPDCCH candidates constituting a search space may be determined based on the indexed ECCEs and blind decoding may be performed, whereby control information may be received.

The user equipment that has received the EPDCCH may transmit ACKNACK for the EPDCCH onto the PUCCH. At this time, resources which are used, that is, index of the PUCCH resources may be determined by the lowest ECCE index of ECCEs used for EPDCCH transmission similarly to Equation 2.

$$n_{PUCCH\text{-}ECCE}^{(1)} = n_{ECCE} + N_{PUCCH}^{(1)} \quad \text{[Equation 2]}$$

In the Equation 2, $n_{PUCCH\text{-}ECCE}^{(1)}$ means the PUCCH resource index, $n_{ECCE}$ means the lowest ECCE index of ECCEs used for EPDCCH transmission, and $N_{PUCCH}^{(1)}$ (which may be referred to as $N_{PUCCH,EPDCCH}^{(1)}$) is a value transferred through higher signaling and means a point where the PUCCH resource index is started.

However, if the PUCCH resource index is determined uniformly by the aforementioned Equation 2, a problem of resource contention may occur. For example, if two EPDCCH PRB sets are configured, since ECCE indexing in each EPDCCH PRB set is independent, the lowest ECCE index in each EPDCCH PRB set may exist equally. In this case, a start point of the PUCCH resource may be varied depending on a user to solve the problem. However, if the start point of the PUCCH resource is varied depending on a user, many PUCCH resources are reserved to lead to be inefficient. Also, since DCI of several users may be transmitted at the same ECCE location in the EPDCCH like MU-MIMO, a method for allocating PUCCH resources by considering such transmission will be required. In order to solve this problem, ARO (HARQ-ACK Resource Offset) has been introduced. The ARO shifts the lowest ECCE index of ECCE indexes constituting the EPDCCH, PUCCH resource determined by start offset of the PUCCH resources transferred through higher layer signaling, to a predetermined level, so as to avoid contention of the PUCCH resources. The ARO is indicated as illustrated in Table 3 below through 2 bits of DCI formats 1A/1B/1D/1/2A/2/2B/2C/2D transmitted through the EPDCCH.

TABLE 3

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

The base station may designate any one of ARO values in Table 3, for a specific user equipment, and then may notify the specific user equipment of ARO, which will be used when the PUCCH resource is determined, through the DCI format. The user equipment may detect an ARO field from its DCI format, and may transmit ACK through the PUCCH resource determined by using the detected value.

When the user equipment receives control information through the aforementioned EPDCCH, particularly, when a localized EPDCCH of a high aggregation level is used, interference may occur due to EPDCCH transmission of a low aggregation level from a neighboring cell. In more detail, a serving cell may transmit a localized EPDCCH of an aggregation level 8 from specific PRB pairs, and a neighboring cell may transmit EPDCCH of aggregation levels 1, 2, etc. from a specific PRB pair. In this case, a precoded signal of the neighboring cell may act as interference in the EPDCCH of the serving cell. If such a single neighboring cell exists, the serving cell may reduce interference through proper precoding. However, if the number of neighboring cells acting as interference sources is increased, it may be difficult to obtain a precoding matrix that may minimize an effect of all the interference signals. Therefore, an improved method for transmitting a localized EPDCCH to reduce interference, configuration of a search space related to the method, and monitoring of a user equipment will be described hereinafter.

Configuration of EPDCCH

ECCEs constituting the localized EPDCCH according to one embodiment of the present invention may be distributed in the EPDCCH PRB set. These examples are shown in FIG. 8. FIG. 8(*a*) illustrates an example that ECCEs of different locations are allocated to different PRB pairs. In this method according to FIG. 8(*a*), ECCEs constituting the localized EPDCCH are distributed uniformly in all the EPDCCH sets. FIG. 8(*b*) illustrates that ECCEs are allocated to the same location of different PRB pairs. In this case, the EPDCCH of aggregation level 4 may affect maximum four ECCEs only of the distributed EPDCCH.

As described above, if ECCEs constituting the localized EPDCCH are distributed in the EPDCCH PRB set, PRB pair and ECCE index may be expressed by the following Equation 3.

$$\text{PRB pair index: } \left\{ \left\lfloor \frac{n*L+j}{N_{RB}^{ECCE}} \right\rfloor + j*\max\left(1, \frac{N_{RB}^{S_m}}{L}\right) \right\} \bmod N_{RB}^{S_m} \quad \text{[Equation 3]}$$

$$\text{ECCE index: } (n*L+j) \bmod N_{RB}^{ECCE}$$

In the above Equation, L means the aggregation level, $N_{RB}^{S_m}$ means the number of RBs which belong to the EPDCCH PRB set ($S_m$), $N_{RB}^{ECCE}$ means the number of ECCEs included in one PRB pair, N means EPDCCH index provided that the search space is filled with the localized EPDCCH, and j means the order of ECCEs allocated within the EPDCCH.

According to the above Equation, the ECCE indexes corresponding to a specific localized EPDCCH may be listed as illustrated in Table 4.

TABLE 4

| N | ECCE index |
|---|---|
| 0 | $(n * L) \bmod (N^{ECCE}_{RB} * N^{S_m}_{RB})$ |
| 1 | $\left[n*L+1+\left\{1*\max\left(1, \frac{N^{S_m}_{RB}}{L}\right)\right\} * N^{ECCE}_{RB}\right] \bmod (N^{ECCE}_{RB} * N^{S_m}_{RB})$ |
| 2 | $\left[n*L+2+\left\{2*\max\left(1, \frac{N^{S_m}_{RB}}{L}\right)\right\} * N^{ECCE}_{RB}\right] \bmod (N^{ECCE}_{RB} * N^{S_m}_{RB})$ |
| ... | ... |
| L-1 | $\left[(n+1)*L-1+\left\{(L-1)*\max\left(1, \frac{N^{S_m}_{RB}}{L}\right)\right\} * N^{ECCE}_{RB}\right] \bmod (N^{ECCE}_{RB} * N^{S_m}_{RB})$ |

FIG. 9 illustrates a basic concept of a method for determining ECCEs constituting the EPDCCH according to the Equation 3. In particular, in FIG. 9, the aggregation level is 4, the number of EPDCCH candidates is 4, and the number of PRB pairs included in the EPDCCH PRB set is 4. Referring to FIG. 9, in the embodiment of the present invention, a location of a main ECCE of each EPDCCH is fixed, and the ECCEs which belong to the other ECCE groups may be shifted within the ECCE groups. That is, as shown in FIG. 9, the ECCEs may be cyclic-shifted (to the left side (or right side) in FIG. 9) as much as ECCE index within the corresponding EPDCCH. Alternatively, if the number of PRB pairs is greater than the aggregation level of the EPDCCH, the ECCEs may be cyclic-shifted to the left side or right side as much as a value of ECCE index within the EPDCCH, which is multiplied by a constant (for example, if the number of PRB pairs is 8 and the aggregation level is 4, the number of PRB pairs/aggregation level=2).

The user equipment may determine EPDCCH candidates per aggregation level in the EPDCCH PRB set, and may perform monitoring in the set of the EPDCCH candidates. Hereinafter, a method for configuring a search space when the EPDCCH is transmitted in accordance with one embodiment of the present invention will be described.

Search Space

In the search space according to one embodiment of the present invention, as described above, ECCEs constituting each of the EPDCCH candidates may be distributed in the EPDCCH PRB set. In more detail, the (y+1)th (1<=y<aggregation level) ECCE of each of the EPDCCH candidates may be shifted from the yth ECCE as much as at least a predetermined number of ECCEs (in this case, shift is cyclic-shift, and when shift is performed, the first ECCE of the EPDCCH PRB set is regarded as next ECCE of the last ECCE of the EPDCCH PRB set.). For example, the second ECCE of the EPDCCH candidates may be shifted from the first ECCE as much as 5 ECCEs. In this case, the predetermined number may satisfy the following Equation 4.

$$\left\{1+\max\left(1, \frac{N^{S_m}_{RB}}{L}\right) \cdot N^{ECCE}_{RB}\right\} \qquad \text{[Equation 4]}$$

In the above Equation 4, $N^{S_m}_{RB}$ may be the number of RBs which belong to the EPDCCH PRB set ($S_m$), and $N^{ECCE}_{RB}$ may be the number of ECCEs included in one PRB pair.

Also, in the search space according to one embodiment of the present invention, the first ECCE of the (x+1)th (1<=x<the number of EPDCCH candidates) EPDCCH candidate and the first ECCE of the xth EPDCCH candidate may be distributed to be adjacent to each other as much as the value of the aggregation level or less. For example, if the aggregation level is 4, the first ECCE of the first EPDCCH candidate and the first ECCE of the second EPDCCH candidate may be spaced apart from each other as much as 4 ECCEs.

In this case, the Equation related to the search space may be the same as the following Equation 5.

$$\left[L\{(Y_{p,k} + m + n_{CI}) \bmod \lfloor N_{ECCE,p,k}/L \rfloor\} + \right.$$

$$\left. i \cdot \left\{1 + \max\left(1, \frac{N^{S_m}_{RB}}{L}\right) \cdot N^{ECCE}_{RB}\right\}\right] \bmod N_{ECCE,p,k} \qquad \text{[Equation 5]}$$

In the Equation 5, L means the aggregation level, $Y_{p,k}$ means initial offset of the kth subframe in the pth EPDCCH PRB set, $M_p^{(L)}$ means the number of EPDCCH candidates for the aggregation level L in the pth EPDCCH PRB set, $m(=0, 1 \ldots M_p^{(L)}-1)$ means the order of EPDCCH candidates, $N_{ECCE,p,k}$ means the number of ECCEs constituting the kth subframe in the pth EPDCCH PRB set, $n_{CI}$ means carrier index, $i(=0, 1, \ldots L-1)$ means the order of ECCEs constituting a specific EPDCCH, $N^{S_m}_{RB}$ means the number of RBs which belong to the EPDCCH PRB set ($S_m$), and $N^{ECCE}_{RB}$ means the number of ECCEs included in one PRB pair.

According to the Equation 5, ECCEs constituting EPDCCH candidates of the search space are distributed uniformly within the EPDCCH PRB set, and the first ECCEs of the respective EPDCCH candidates are adjacent to each other as much as an interval of the aggregation level value. According to the Equation 5, the search space is configured as shown in FIGS. 10 to 13. In FIGS. 10 to 13, it is provided that $Y_{p,k}=1$ and carrier aggregation is not used. Also, in FIGS. 10 to 13, shades represent the first ECCEs of the respective EPDCCH candidates, and numbers represent EPDCCH candidates to which the corresponding ECCEs belong. Also, in each of FIGS. 10 to 13, (a), (b) and (c) represent that sizes of the respective EPDCCH PRB sets are 2, 4, and 8 PRB pairs.

Figure 10:
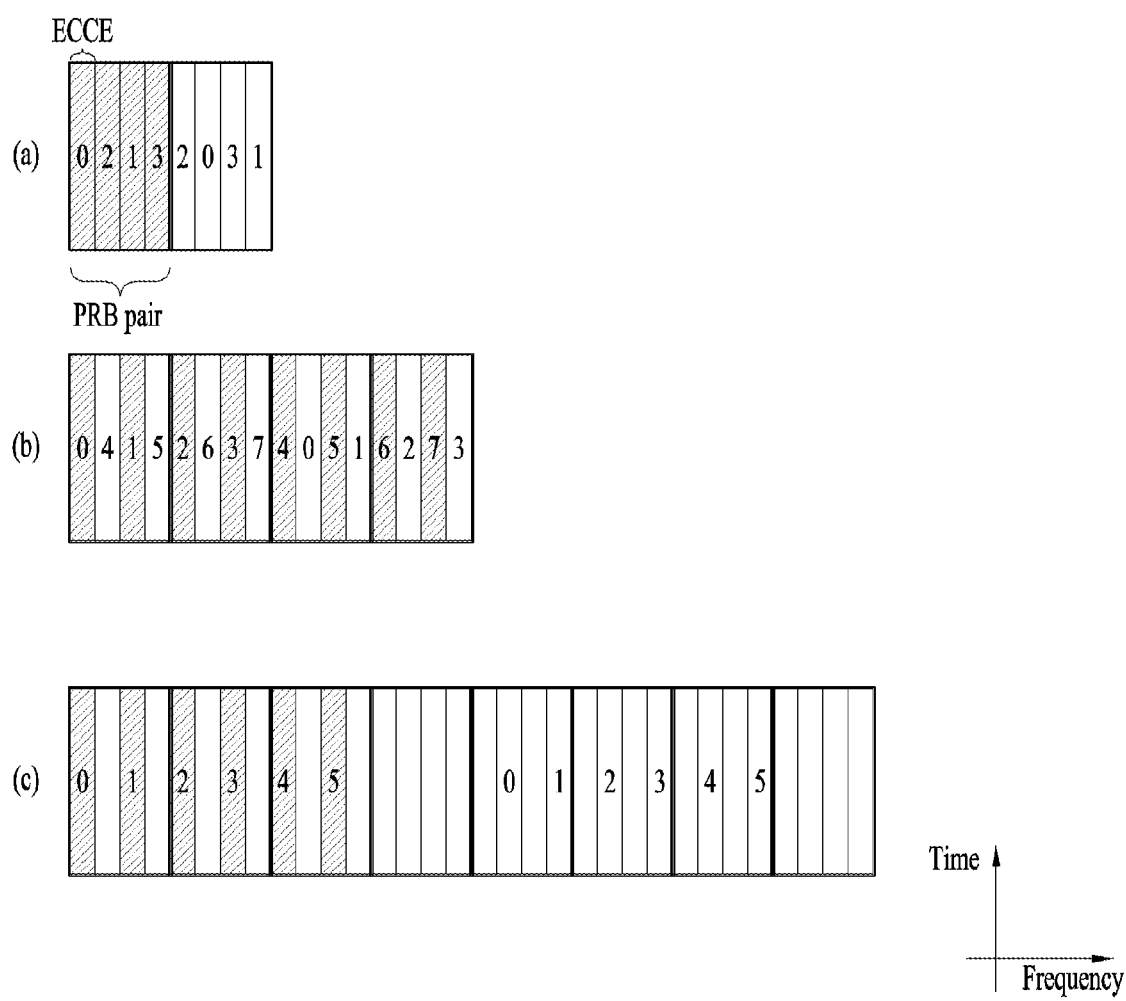
FIGS. 10 to 13 are diagrams illustrating search spaces according to the embodiment of the present invention.
Figure 11:
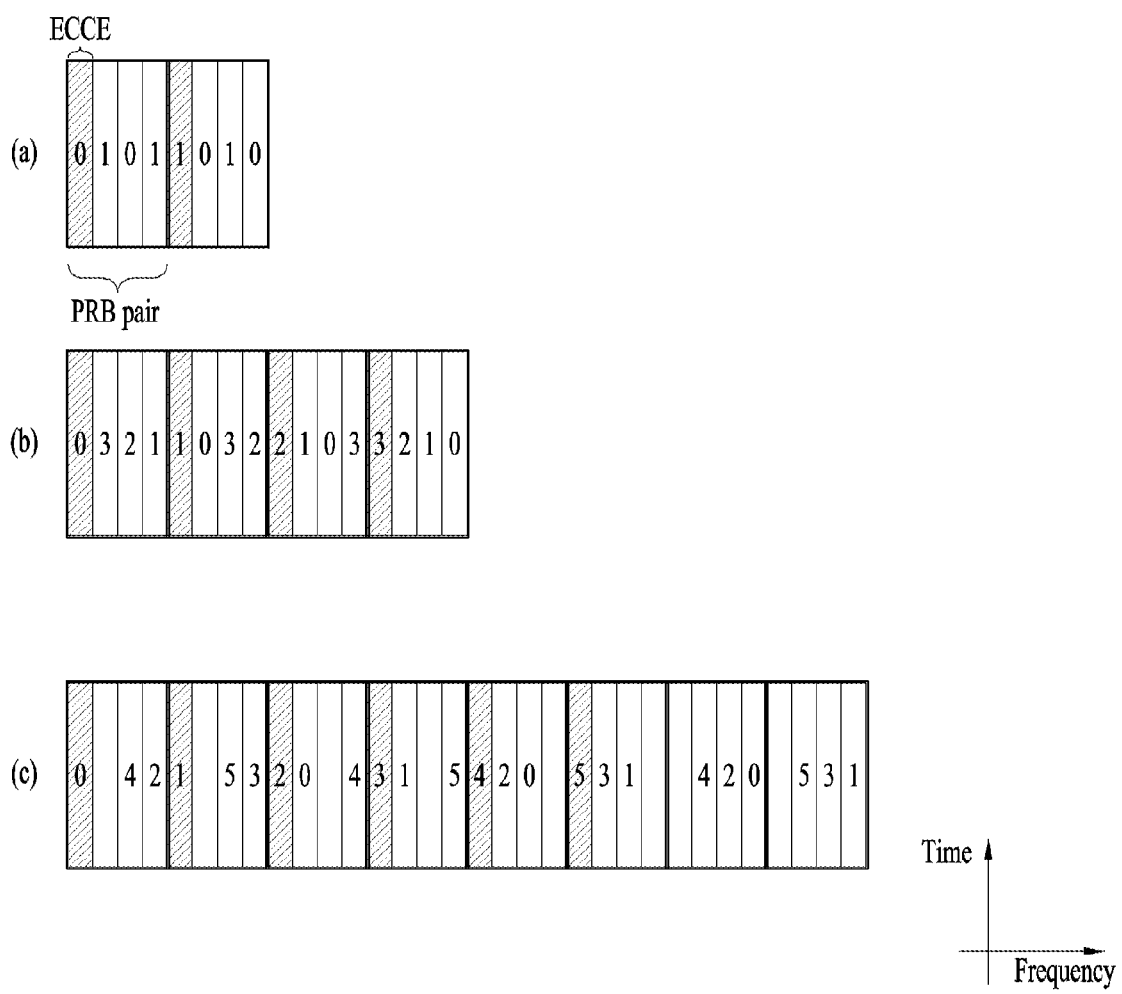
Figure 12:
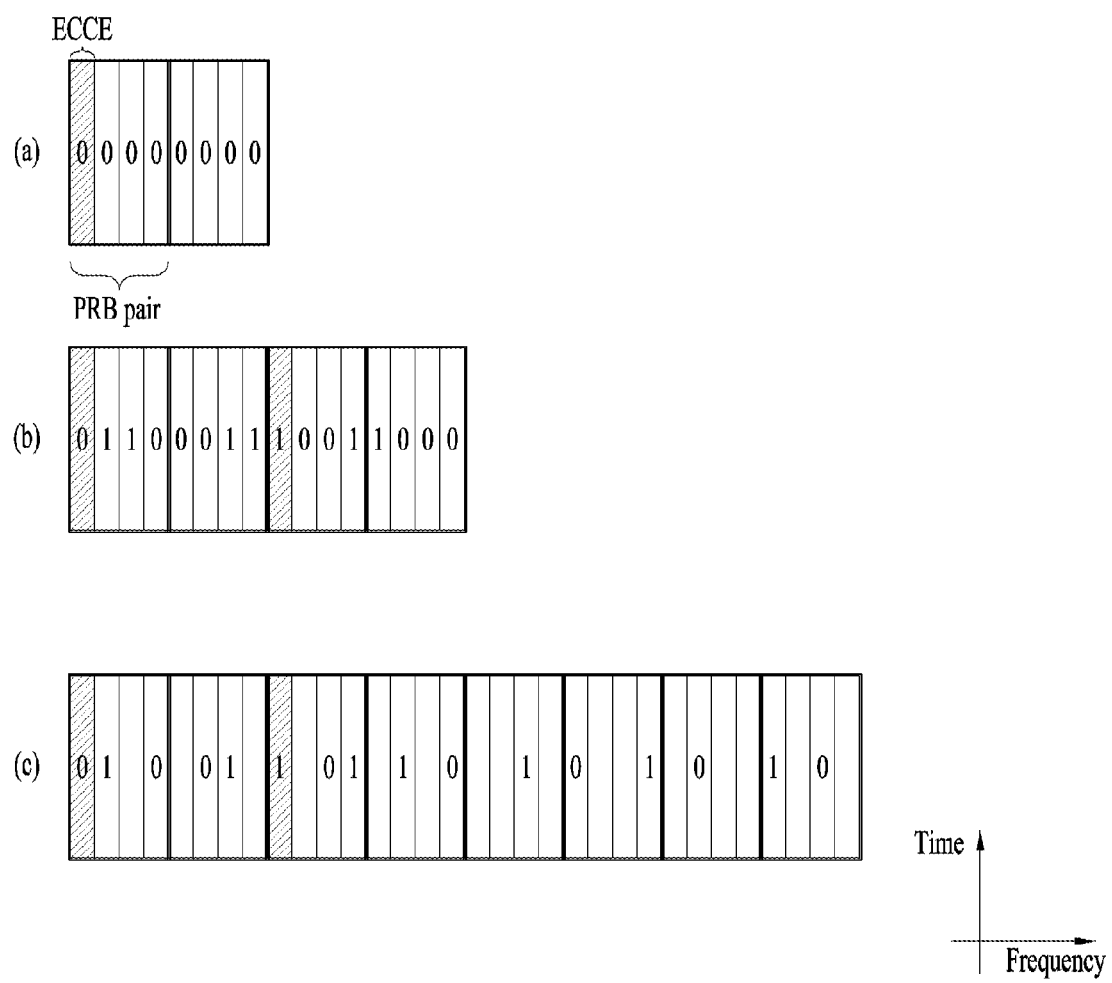
Figure 13:
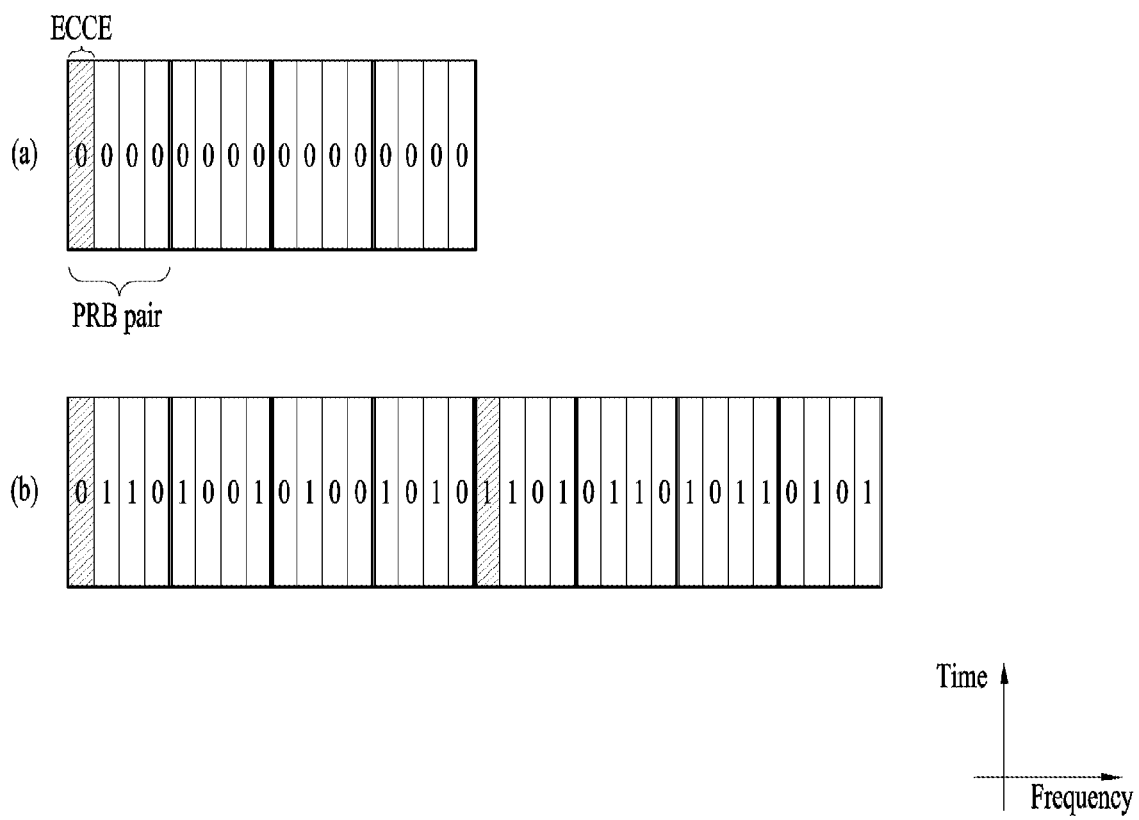

First of all, the search space of which aggregation level is 2 is shown in FIG. 10. If the aggregation level is 2, the predetermined number is increased in proportion to the increase of the EPDCCH PRB set (that is, in proportion to the increased number of PRB pairs included in the EPDCCH PRB set). That is, as shown, the ECCEs constituting one EPDCCH candidate in FIG. 9(c) may be spaced to be far away than that in FIG. 9(a). The search space of which aggregation level is 4 is shown in FIG. 11. In FIGS. 11(a), (b) and (c), ECCEs constituting one EPDCCH candidate are distributed to be spaced apart from each other as much as 5, 5 and 9 ECCEs, respectively. The search spaces of which aggregation levels are 8 and 16 are shown in FIGS. 12 and 13. In this case, it is noted that the predetermined number is 5 equally regardless of the size of the EPDCCH candidate set. As shown in FIGS. 10 to 13, according to the embodiment of the present invention, the ECCEs constituting one EPDCCH candidate are distributed to be spaced apart from each other at a predetermined level within the EPDCCH PRB set even in case of the localized EPDCCH transmission. Therefore, as described above, interference caused by the precoded EPDCCH transmission from the neighboring cells may be reduced.

Meanwhile, the following Equation 6 may be used as the Equation related to the search space. In this case, the EPDCCH candidates may be distributed to be relatively more spaced apart from each other within the search space.

$$\left[ L \left\{ \left( Y_{p,k} + \left\lfloor \frac{m \cdot N_{ECCE,p,k}}{L \cdot M_p^{(L)}} \right\rfloor + n_{CI} \right) \mod \lfloor N_{ECCE,p,k}/L \rfloor \right\} + i \cdot \left\{ 1 + \max\left(1, \frac{N_{RB}^{S_m}}{L}\right) \cdot N_{RB}^{ECCE} \right\} \right] \mod N_{ECCE,p,k}$$ [Equation 5]

Also, if the number of times for blind decoding for the EPDCCH of the aggregation level L is not great (for example, 1 or 2), or if the EPDCCH PRB set is sufficiently greater than the size of the EPDCCH (for example, 8 PRB pairs and aggregation level 4) and the EPDCCHs are sufficiently spaced apart from one another, it is not required that the start location of the respective EPDCCH candidates of the EPDCCH should be configured to generate a difference as much as L or index corresponding to a multiple of L. Therefore, the search space expressed by the following Equation 6 may be used.

$$\left[ (Y_{p,k} + m + n_{CI}) + i \cdot \left\{ 1 + \max\left(1, \frac{N_{RB}^{S_m}}{L}\right) \cdot N_{RB}^{ECCE} \right\} \right] \mod N_{ECCE,p,k}$$ [Equation 6]

Antenna Port Mapping

Figure 14:
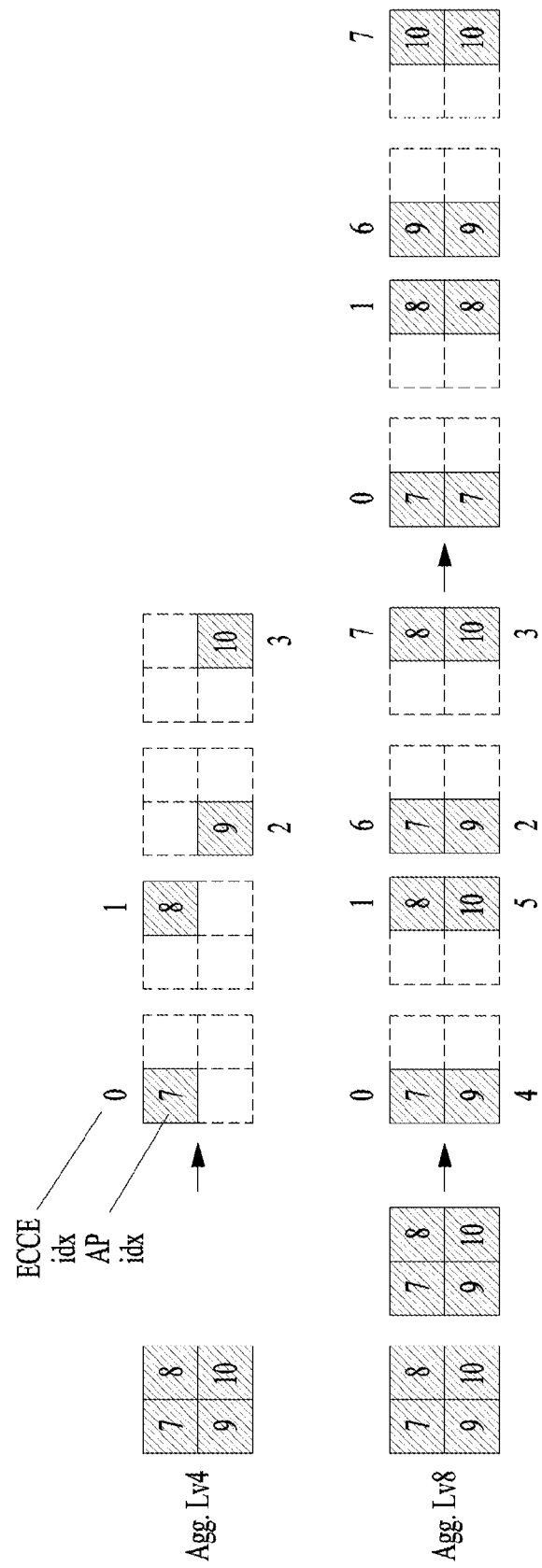
FIG. 14 is a diagram illustrating antenna port mapping according to the embodiment of the present invention.

According to the aforementioned embodiment of the present invention, ECCEs which belong to one EPDCCH candidates may be included in a plurality of PRB pairs, and if one ECCE is included in one PRB pair, each antenna port allocated to each ECCE may be used. In FIG. 8(a), ECCEs of different locations may be allocated to each PRB pair. Also, since a plurality of ports may be allocated to the corresponding EPDCCH, the corresponding EPDCCH may be applied to MIMO transmission system of a plurality of layers such as MU-MIMO system. In FIG. 8(b), the respective ECCEs of the EPDCCH may be allocated to the same locations of the PRB pairs, and the same port may be allocated to the respective ECCEs, whereby the corresponding EPDCCH may be applied to another system other than the MU-MIMO system. In respect of the aforementioned embodiment, if the EPDCCH of a high aggregation level includes ECCEs included in a plurality of PRB pairs, and two or more ECCEs are included in one PRB pair (for example, in case of the aggregation level 8 in FIG. 14), the antenna port allocated to the lowest ECCE index may be set to a main antenna port. In this system, the antenna ports of different indexes may be allocated to the respective PRB pairs, whereby spatial diversity or spatial multiplexing rate may be increased.

PUCCH Transmission Diversity

If transmission diversity is applied to the PUCCH resources associated with the EPDCCH, two PUCCH resources are used and have adjacent indexes. That is, in a state that PUCCH transmission diversity is applied, if a main ECCE index 'm' of a specific EPDCCH is associated with the PUCCH resource index 'n', the main ECCE index 'm' is associated with the PUCCH resources having indexes of 'n' and 'n+1' for diversity. As far as the ECCEs aggregated as above are not subjected to ECCE index reordering, ECCEs of continuous indexes may not be allocated, whereby such association may have a problem. That is, in a state that PUCCH transmission diversity is applied, ECCE indexes of a specific EPDCCH are 'm' and 'm+k' (k=1 or integer other than 0), respectively, and if the main ECCE index 'm' among the indexes is associated with the PUCCH resource index 'n', the main ECCE index 'm' may be associated with the PUCCH resource having indexes of n, n+p, . . . (p=1 or integer other than 0) for diversity.

In order that the aforementioned embodiments are applied to the legacy LTE-A system, a signal defined with necessary operations may be transferred through physical signaling, higher layer signaling, etc. Alternatively, the use of the suggested methods may be determined automatically or implicitly by a manner which is previously scheduled. Among the methods, all/some of a precoding method for transmitting a localized EPDCCH, a method for mapping corresponding resources, an antenna port mapping method, a PUCCH TxD method, and a method for configuring a search space may be used in combination. As an example of the method used by the manner which is previously scheduled, a user equipment operated by a subband CSI based precoding method may use a wideband CSI based precoding method if a level of interference which is measured is greater than a specific threshold value. This change may be applied through a modification period without directly being updated, whereby the user equipment may need to demodulate data by assuming the two methods for a specific period.

A measurement value of interference that affects a neighboring cell may be varied depending on the wideband CSI based measurement method. Therefore, the serving cell may share information of a bandwidth used by the user equipment through backhaul signaling with the neighboring cell or information of a bandwidth for measuring wideband CSI, and may measure more exact wideband CSI by using the shared information. As the method for measuring the wideband CSI, i) an average value of more bands (or full band) if possible may be obtained, ii) only an area corresponding to the EPDCCH PRB set transmitted and received by the user equipment may be measured, or iii) necessary bands may be measured in random combination. If the CSI is measured for the full band or the area only corresponding to the EPDCCH PRB set transmitted and received by the user equipment, special information change with the neighboring cells may not be required. However, for measurement based on random combination of the necessary bands, information change with the neighboring cells will be required. For example, information on bands (for example, RB, RB group, RB cluster, or indexes of subbands) of the EPDCCH PRB set configured in each cell may be exchanged with the neighboring cells through X2 signaling. At this time, if the wideband CSI is measured using the corresponding information, a union or intersection area between the area (configured RB, RB group, RB cluster or subbands) of the EPDCCH PRB set of the serving cell and the areas of the EPDCCH PRB set of the neighboring cells (of which interference size is sufficiently meaningful) may be selected as an effective area of measurement. The information on wideband CSI measurement may be transmitted from the serving cell to the user equipment through physical signaling, higher layer signaling, etc., or may be determined automatically or implicitly by a manner which is previously scheduled.

Configuration of Apparatus According to the Embodiment of the Present Invention

Figure 15:
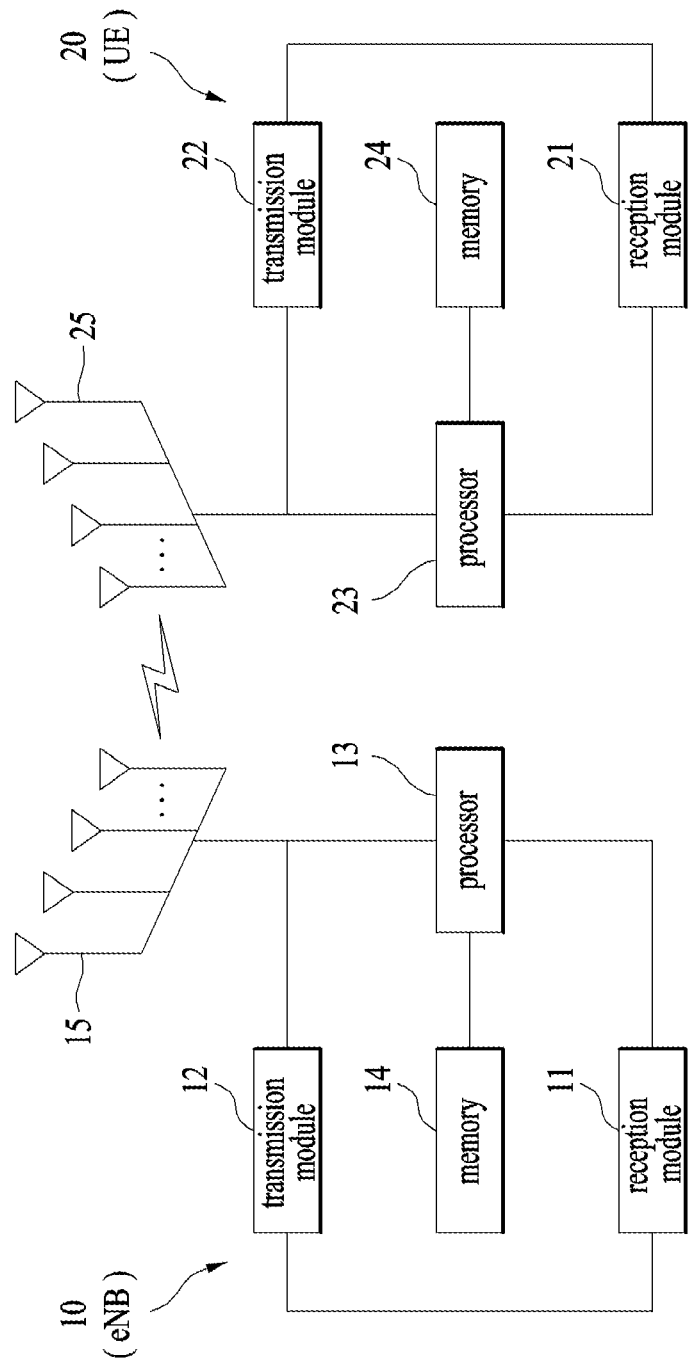
FIG. 15 is a diagram illustrating a configuration of a transceiving apparatus.

FIG. 15 is a diagram illustrating configurations of a transmission point and a user equipment UE according to one embodiment of the present invention.

Referring to FIG. 15 a transmission point 10 according to the present invention may include a reception module 11, a transmission module 12, a processor 13, a memory 14, and a plurality of antennas 15. The plurality of antennas 15 mean the transmission point that supports MIMO transmission and reception. The reception module 11 may receive various signals, data and information from the user equipment on an uplink. The transmission module 12 may transmit various signals, data and information to the user equipment on a downlink. The processor 113 may control overall operation of the transmission point 10.

The processor 13 of the transmission point 10 according to one embodiment of the present invention may perform operations necessary for the embodiments described above.

The processor 13 of the transmission point 10 may function to computationally process information received by the transmission point 10 or information to be transmitted to the outside, etc. The memory 14, which may be replaced with an element such as a buffer (not shown), may store the computationally processed information for a predetermined time.

Subsequently, referring to FIG. 15, the user equipment UE 20 according to the present invention may include a reception module 21, a transmission module 22, a processor 23, a memory 24, and a plurality of antennas 25. The plurality of antennas 25 mean the user equipment that supports MIMO transmission and reception. The reception module 21 may receive various signals, data and information from a base station eNB on a downlink. The transmission module 22 may transmit various signals, data and information to the base station on an uplink. The processor 23 may control overall operation of the user equipment 20.

The processor 23 of the user equipment 20 according to one embodiment of the present invention may perform operations necessary for the embodiments described above.

The processor 23 of the user equipment 20 may function to computationally process information received by the user equipment 20 or information to be transmitted to the outside, and the memory 24, which may be replaced with an element such as a buffer (not shown), may store the computationally processed information for a predetermined time.

The configurations of the transmission point and the user equipment as described above may be implemented such that the above-described embodiments are independently applied or two or more thereof are simultaneously applied, and description of redundant parts will be omitted for clarity.

Also, description of the transmission point 10 in FIG. 15 may also be applied to a relay which serves as a downlink transmitter or an uplink receiver, and description of the user equipment 20 may be equally applied to a relay which serves as a downlink receiver or an uplink transmitter.

The aforementioned embodiments of the present invention may be implemented through various means, for example, hardware, firmware, software, or a combination thereof.

When implemented by hardware, the method according to the embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, the method according to the embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

The detailed description of the preferred embodiments of the present invention disclosed as above has been provided such that those skilled in the art may embody and carry out the present invention. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

INDUSTRIAL APPLICABILITY

The aforementioned embodiments of the present invention may be applied to various mobile communication systems.

The invention claimed is:
1. A method for enabling a user equipment to receive downlink control information in a wireless communication system, the method comprising:
 determining enhanced physical downlink control channel (EPDCCH) candidates per aggregation level in an enhanced physical downlink control channel physical resource block (EPDCCH PRB) set; and
 performing monitoring in a set of the EPDCCH candidates,
 wherein enhanced control channel elements (ECCEs) configuring each of the EPDCCH candidates are distributed in the EPDCCH PRB set, and wherein a $(y+1)^{th}$ ECCE of each of the EPDCCH candidates is shifted from a $y^{th}$ ECCE as much as at least a predetermined number of ECCEs, where 1≤y<aggregation level.

2. The method according to claim 1, wherein a first ECCE of an $(x+1)^{th}$ EPDCCH candidate and a first ECCE of an $x^{th}$ EPDCCH candidate are distributed to be adjacent to each other as much as a value of the aggregation level or less, where 1≤x<the number of EPDCCH candidates.

3. The method according to claim 1, wherein the predetermined number of ECCEs is increased if a number of PRB pairs included in the EPDCCH PRB set is increased in an aggregation level of 2.

4. The method according to claim 1, wherein the predetermined number of ECCEs is given equally regardless of a size of the EPDCCH PRB set if the aggregation level is greater than 8.

5. The method according to claim 1, wherein the predetermined number of ECCEs corresponds to 5, 5 and 9 if the aggregation level is 4 and the number of PRB pairs included in the EPDCCH PRB set corresponds to 2, 4 and 8.

6. The method according to claim 1, wherein a first ECCE of the EPDCCH PRB set is regarded as a next ECCE of a last ECCE of the EPDCCH PRB set when a shift is performed.

7. The method according to claim 1, wherein the predetermined of ECCEs number corresponds to $$\left\{1+\max\left(1, \frac{N_{RB}^{S_m}}{L}\right) \cdot N_{RB}^{ECCE}\right\},$$

where $S_m$ is the EPDCCH PRB set, $N_{RB}^{S_m}$ is a number of resource blocks (RBs) which belong to the EPDCCH PRB set ($S_m$), and $N_{RB}^{ECCE}$ is a number of ECCEs included in one PRB pair.

8. The method according to claim 1, wherein the EPDCCH candidates are determined by a following Equation:

$$\left[L\{(Y_{p,k}+m+n_{CI})\mathrm{mod}\lfloor N_{ECCE,p,k}/L\rfloor\}+i\cdot\left\{1+\max\left(1,\frac{N_{RB}^{S_m}}{L}\right)\cdot N_{RB}^{ECCE}\right\}\right]$$
$$\mathrm{mod}\ N_{ECCE,p,k},$$

where $s_m$ is the EPDCCH PRB set, L is the aggregation level, $Y_{p,k}$ is an initial offset of a $k^{th}$ subframe in $p^{th}$ EPDCCH PRB set, $M_p^{(L)}$ is a number of EPDCCH candidates for the aggregation level L in the $p^{th}$ EPDCCH PRB set, $m(=0,1,\ldots M_p^{(L)}-1)$ is an order of EPDCCH candidates, $N_{ECCE,p,k}$ is a number of ECCEs constituting the $k^{th}$ subframe in the $p^{th}$ EPDCCH PRB set, $n_{CI}$ is a carrier index, $i(=0,1,\ldots L-1)$ is an order of ECCEs constituting a specific EPDCCH, $N_{RB}^{S_m}$ is a number of resource blocks (RBs) which belong to the EPDCCH PRB set ($S_m$), and $N_{RB}^{ECCE}$ is a number of ECCEs included in one PRB pair.

9. The method according to claim 1, wherein the EPDCCH candidates are determined by a following Equation:

$$\left[(Y_{p,k}+m+n_{CI})+i\cdot\left\{1+\max\left(1,\frac{N_{RB}^{S_m}}{L}\right)\cdot N_{RB}^{ECCE}\right\}\right]\mathrm{mod}\ N_{ECCE,p,k},$$

where $S_m$ is the EPDCCH PRB set, L is the aggregation level, $Y_{p,k}$ is an initial offset of a $k^{th}$ subframe in a $p^{th}$ EPDCCH PRB set, $M_p^{(L)}$ is a number of EPDCCH candidates for the aggregation level L in the pth EPDCCH PRB set, $m(=0,1,\ldots M_p^{(L)}-)$ is an order of EPDCCH candidates, $N_{ECCE,p,k}$ is a number of ECCEs constituting the $k^{th}$ subframe in the $p^{th}$ EPDCCH PRB set, $n_{CI}$ is a carrier index, $i(=0,1,\ldots L31\ 1)$ is an order of ECCEs constituting a specific EPDCCH, $N_{RB}^{S_m}$ is a number of resource blocks (RBs) which belong to the EPDCCH PRB set ($s_m$), and $N_{RB}^{ECCE}$ is a number of ECCEs included in one PRB pair.

10. The method according to claim 1, wherein the EPDCCH candidates are determined by a following Equation:

$$\left[L\left\{\left(Y_{p,k}+\left\lfloor\frac{m\cdot N_{ECCE,p,k}}{L\cdot M_p^{(L)}}\right\rfloor+n_{CI}\right)\mathrm{mod}\lfloor N_{ECCE,p,k}/L\rfloor\right\}+\right.$$
$$\left.i\cdot\left\{1+\max\left(1,\frac{N_{RB}^{S_m}}{L}\right)\cdot N_{RB}^{ECCE}\right\}\right]\mathrm{mod}\ N_{ECCE,p,k},$$

where $s_m$ is the EPDCCH PRB set, L is the aggregation level, $Y_{p,k}$ is an initial offset of a $k^{th}$ subframe in a $p^{th}$ EPDCCH PRB set, $M_p^{(L)}$ is a number of EPDCCH candidates for the aggregation level L in the $p^{th}$ EPDCCH PRB set, $m(=0,1,\ldots M_p^{(L)}-1)$ is an order of EPDCCH candidates, $N_{ECCE,p,k}$ is a number of ECCEs constituting the $k^{th}$ subframe in the $p^{th}$ EPDCCH PRB set, $n_{CI}$ is a carrier index, $i(=0,1,\ldots L-1)$ is an order of ECCEs costituting a specific EPDCCH, $N_{RB}^{S_m}$ is a number of resource blocks blocks (RBs) which belong to the EPDCCH PRB set ($S_m$), and $N_{RB}^{ECCE}$ is a number of ECCEs included in one PRB pair.

11. The method according to claim 1, wherein the user equipment measures wideband channel state information for an area corresponding to the EPDCCH PRB set.

12. A user equipment in a wireless communication system, the user equipment comprising:
a reception module; and
a processor connected with the reception module,
wherein the processor is configured to:
determine enhanced physical downlink control channel (EPDCCH) candidates per aggregation level in an enhanced physical downlink control channel physical resource block (EPDCCH PRB) set, and
perform monitoring in a set of the EPDCCH candidates,
wherein enhanced control channel elements (EECEs) configuring each of the EPDCCH candidates are distributed in the EPDCCH PRB set, and
wherein a $(y+1)^{th}$ ECCE of each of the EPDCCH candidates is shifted from a $y^{th}$ ECCE as much as at least a predetermined number of ECCEs, where 1≤y<aggregation level.

* * * * *